United States Patent
Tang

(10) Patent No.: US 11,893,614 B2
(45) Date of Patent: Feb. 6, 2024

(54) SYSTEMS AND METHODS FOR BALANCING ONLINE STORES ACROSS SERVERS

(71) Applicant: Shopify Inc., Ottawa (CA)

(72) Inventor: Kathryn Tang, Comox (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/408,644

(22) Filed: Aug. 23, 2021

(65) Prior Publication Data

US 2023/0057832 A1 Feb. 23, 2023

(51) Int. Cl.
*G06Q 30/0601* (2023.01)
*G06Q 30/0207* (2023.01)

(52) U.S. Cl.
CPC ..... *G06Q 30/0605* (2013.01); *G06Q 30/0222* (2013.01)

(58) Field of Classification Search
CPC ........................ G06Q 30/0605; G06Q 30/0222
See application file for complete search history.

(56) References Cited

U.S. PATENT DOCUMENTS

| | | | |
|---|---|---|---|
| 7,660,894 B1* | 2/2010 | Carrie | H04L 67/1001 709/225 |
| 9,727,882 B1* | 8/2017 | Huntwork | G06Q 30/0202 |
| 9,871,744 B2 | 1/2018 | Janssens | |
| 9,979,617 B1 | 5/2018 | Meyer | |
| 10,409,649 B1* | 9/2019 | Young | G06F 9/5083 |
| 10,949,894 B1 | 3/2021 | Bansal | |
| 10,997,662 B1 | 5/2021 | Warfel | |
| 2001/0037374 A1 | 11/2001 | Shrum et al. | |
| 2004/0111504 A1 | 6/2004 | Halim et al. | |
| 2006/0168223 A1* | 7/2006 | Mishra | H04L 67/1008 709/225 |
| 2008/0320484 A1 | 12/2008 | Rosenbach et al. | |
| 2009/0157879 A1* | 6/2009 | Stoll | H04L 67/1017 709/226 |
| 2013/0110674 A1 | 5/2013 | Schoettle | |
| 2014/0006482 A1* | 1/2014 | Raghu | G06Q 40/125 709/203 |
| 2014/0025535 A1 | 1/2014 | Douglas | |
| 2014/0365350 A1 | 12/2014 | Shvarts | |
| 2016/0189191 A1 | 6/2016 | Spalding | |
| 2016/0321115 A1 | 11/2016 | Thorpe | |
| 2017/0214738 A1 | 7/2017 | Agarwal | |

(Continued)

OTHER PUBLICATIONS

An e-comm taste-tester. Caruso, Jeff. Network World. 22.29: 64,66. Foundry. (Jul. 25, 2005). Retrieved via ProQuest (Year: 2005).*

(Continued)

*Primary Examiner* — Michael Misiaszek
(74) *Attorney, Agent, or Firm* — Rowand LLP

(57) ABSTRACT

Methods and systems for balancing online stores across servers. Monitoring a level of customer activity associated with a particular online store in a plurality of online stores. Detecting, based on the level of customer activity, a demand-level condition for the particular online store. Responsive to the detecting of the demand-level condition for the particular online store, moving one or more of the plurality of online stores from a first server of a plurality of servers to a second server of the plurality of servers.

20 Claims, 9 Drawing Sheets

(56) References Cited

U.S. PATENT DOCUMENTS

| | | | |
|---|---|---|---|
| 2018/0032997 A1 | | 2/2018 | Gordon et al. |
| 2019/0306061 A1 | | 10/2019 | Lesartre |
| 2020/0175535 A1 | | 6/2020 | Xu |
| 2020/0192706 A1 | | 6/2020 | Huus |
| 2020/0242639 A1 | | 7/2020 | Laserson |
| 2020/0329097 A1 | | 10/2020 | Kumbi |
| 2020/0409914 A1 | * | 12/2020 | Nadimpalli ........... G06F 3/0607 |
| 2021/0241240 A1 | | 8/2021 | Lyver et al. |
| 2021/0243160 A1 | | 8/2021 | Francis |
| 2022/0084057 A1 | | 3/2022 | Lai |
| 2022/0171647 A1 | * | 6/2022 | Muth ................. H04L 43/0876 |
| 2022/0244993 A1 | | 8/2022 | MacDonald |

OTHER PUBLICATIONS

Scaling Your E-Business. Menasce, Daniel; Almeida, Virgilio. Software Magazine. 21.1: 42. King Content Co. / Software Magazine. (Feb. 2001). Retrieved via ProQuest (Year: 2001).*

2021 E-Commerce: No Rest for the Weary: COVID-19 accelerated e-commerce demand to levels that weren't expected until 2025. How can supply chains get up to speed-and fast? Argod, Vikas. Logistics Management (Highlands Ranch, Co.)60.4: 60(5). Peerless Media, LLC. (Apr. 2021). Retrieved via ProQuest (Year: 2021).*

6 Steps To Holiday-Proof Your Website. Casey, Kevin. Informationweek—Online Informa. (Oct. 11, 2011). Retireved via ProQuest (Year: 2011).*

Yazdanov, Lenar. Towards auto-scaling in the cloud: online resource allocation techniques. 2016. Dissertation. Technische Universität Dresden. (Year: 2016).

Chandra, Abhishek, and Prashant Shenoy. "Effectiveness of Dynamic Resource Allocation for Handling Internet Flash Crowds." TR03-37, Department of Computer Science, University of Massachusetts Amherst, USA (2003).

Extended European Search Report dated Sep. 12, 2022, Application No. 22169543.0.

CA Application No. 3,160,024; Office Action dated Sep. 29, 2023.

* cited by examiner

FIG. 2

SYSTEMS AND METHODS FOR BALANCING ONLINE STORES ACROSS SERVERS

FIELD

The present disclosure relates to distributed data processing, and, more particularly, to balancing request load among servers such as, for example, in e-commerce systems.

BACKGROUND

E-commerce systems may encounter heavy loads. For example, particularly heavy demand may need to be serviced in supporting flash sale events. A flash sale event may be caused by a promotion of one or more products that are offered for sale. As a result of the promotion, an online store may suddenly receive a high rate of order requests over a short period of time. Such events place a tremendous strain on e-commerce systems and third party resources, particularly when millions of customers concurrently attempt and/or complete checkout.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

Figure 1:
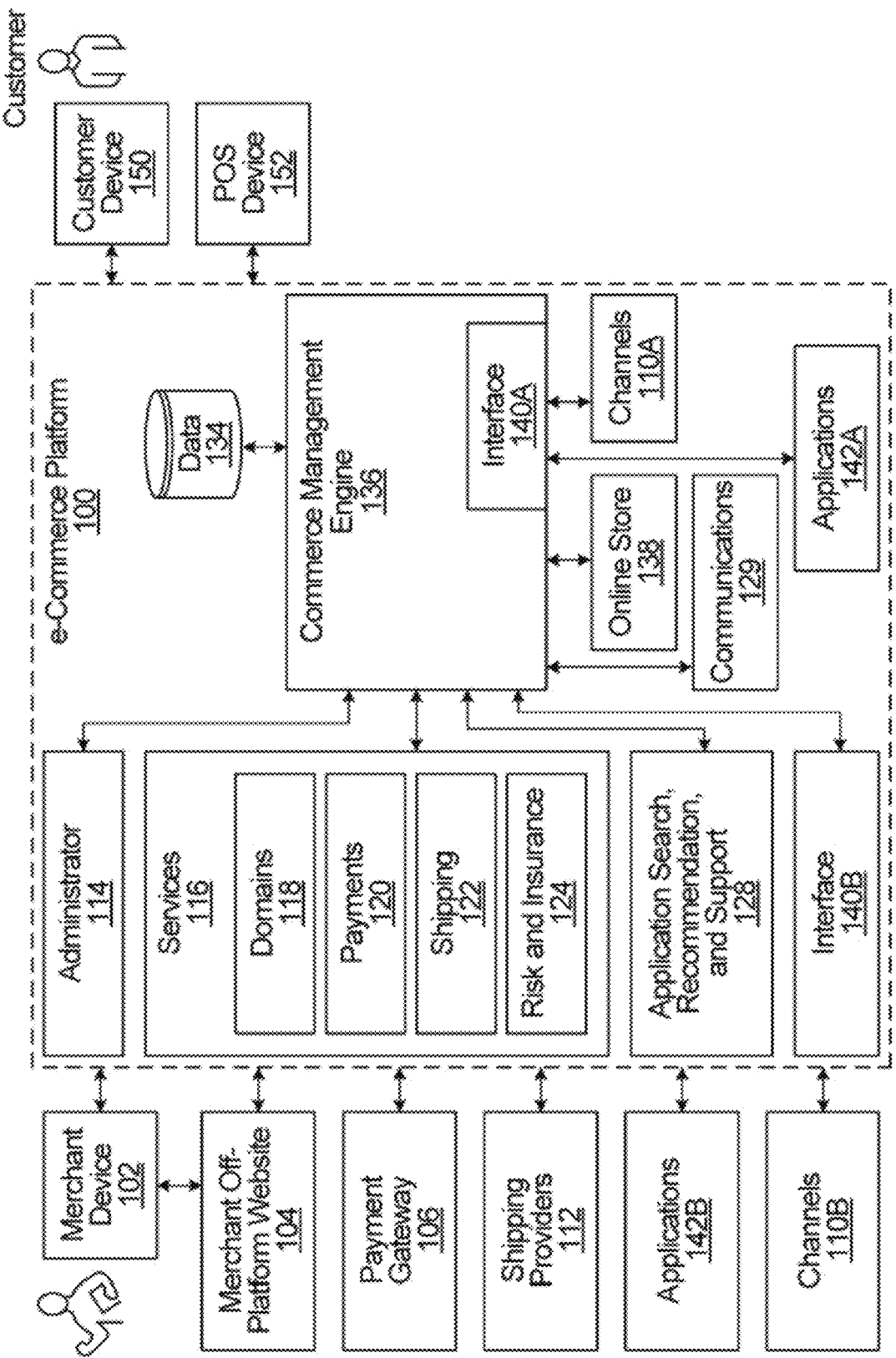
FIG. 1 is a block diagram of an e-commerce platform, according to one embodiment.

In one aspect, the present application describes a computer-implemented method for balancing online stores across servers. The method may include monitoring a level of customer activity associated with a particular online store in a plurality of online stores; detecting, based on the level of customer activity, a demand-level condition for the particular online store; and responsive to the detecting of the demand-level condition for the particular online store, moving one or more of the plurality of online stores from a first server of a plurality of servers to a second server of the plurality of servers.

In some implementations, detecting the demand-level condition may include detecting that the level of customer activity is suggestive of a current flash sale event.

In some implementations, detecting the demand-level condition may include detecting a projected flash sale event.

In some implementations, detecting the demand-level condition may include detecting a scheduled flash sale event.

In some implementations, the demand-level condition may include a high demand-level condition.

In some implementations, the demand-level condition may include a low demand-level condition.

In some implementations, the method may further include determining, based on a second level of customer activity, the demand-level condition no longer exists and, in response, moving at least one of the one or more of the plurality of online stores away from the second server.

In some implementations, moving the one or more of the plurality of online stores may include moving the particular online store.

In some implementations, the second server may have increased computing resources in comparison to the first server.

In some implementations, moving the one or more of the plurality of online stores may not include moving the particular online store.

In another aspect, the present application describes a system including a processor; and a memory storing computer-executable instructions that, when executed by the processor, are to cause the processor to monitor a level of customer activity associated with a particular online store in a plurality of online stores; detect, based on the level of customer activity, a demand-level condition for the particular online store; and responsive to the detecting of the demand-level condition for the particular online store, move one or more of the plurality of online stores from a first server of a plurality of servers to a second server of the plurality of servers.

In some embodiments, the instructions, when executed by the processor, may cause the processor to determine, based on a second level of customer activity, the demand-level condition no longer exists and, in response, move at least one of the one or more of the plurality of online stores away from the second server.

In another aspect, the present application discloses a non-transitory, computer-readable medium storing processor-executable instructions that, when executed by one or more processors, are to cause the one or more processors to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, reference may be made to the term "policy". A policy may generally refer to a data structure and/or information. A policy may include a set of preferences, rules, conditions or other criteria for defining the behaviour of operations of the e-commerce platform or a component or function thereof. The policy may be used to provide store-specific and/or server-specific policy data that is customizable on a per-store and/or per-server basis. The policy may include a merchant defined policy or a subscription plan (e.g. a fee structure indicating the level of service provided by an e-commerce platform to an online store). In some embodiments, the policy may be configured, for example, by a merchant via a user interface provided by an e-commerce platform.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
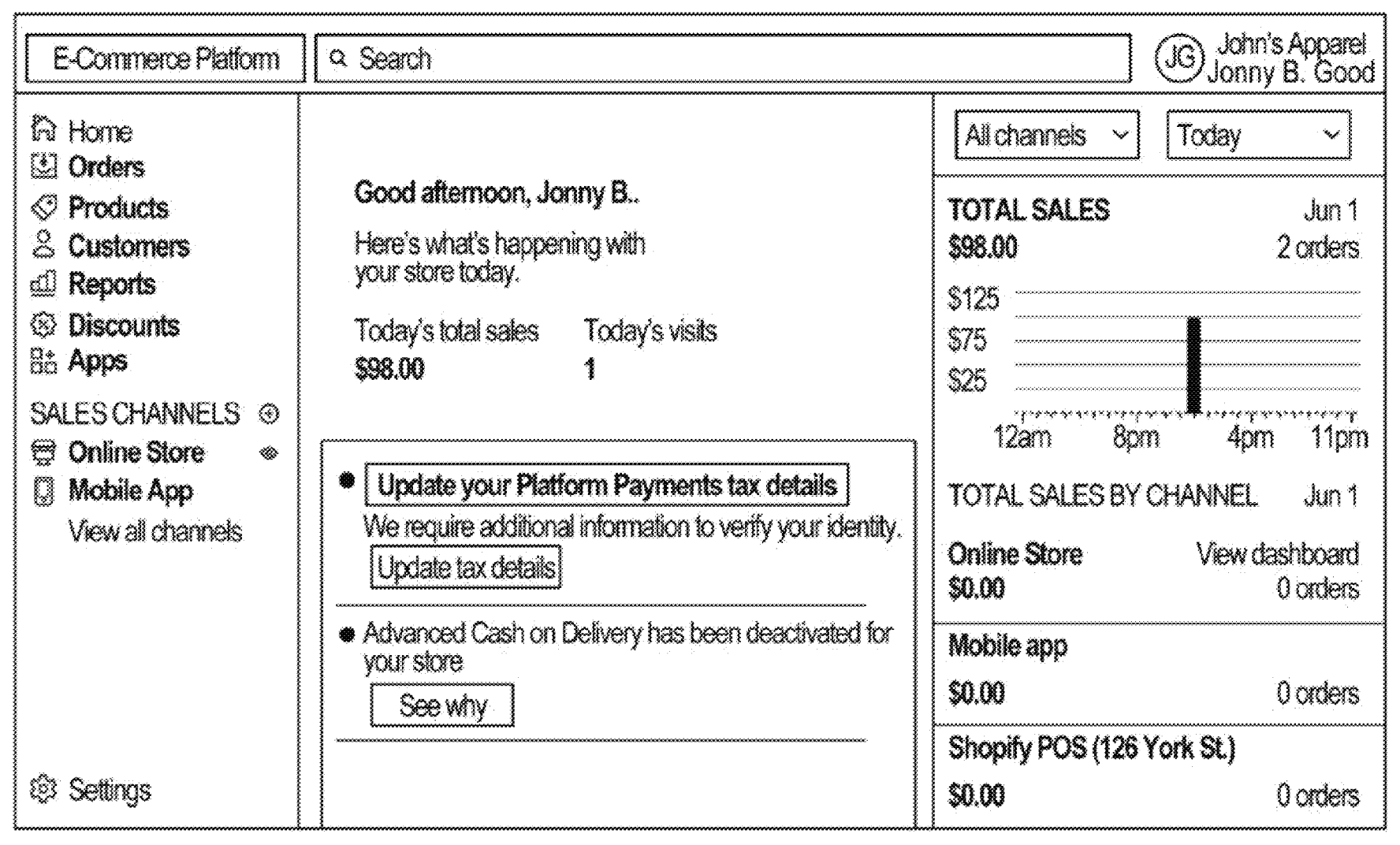

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Balancing Load Across Servers

Figure 3:
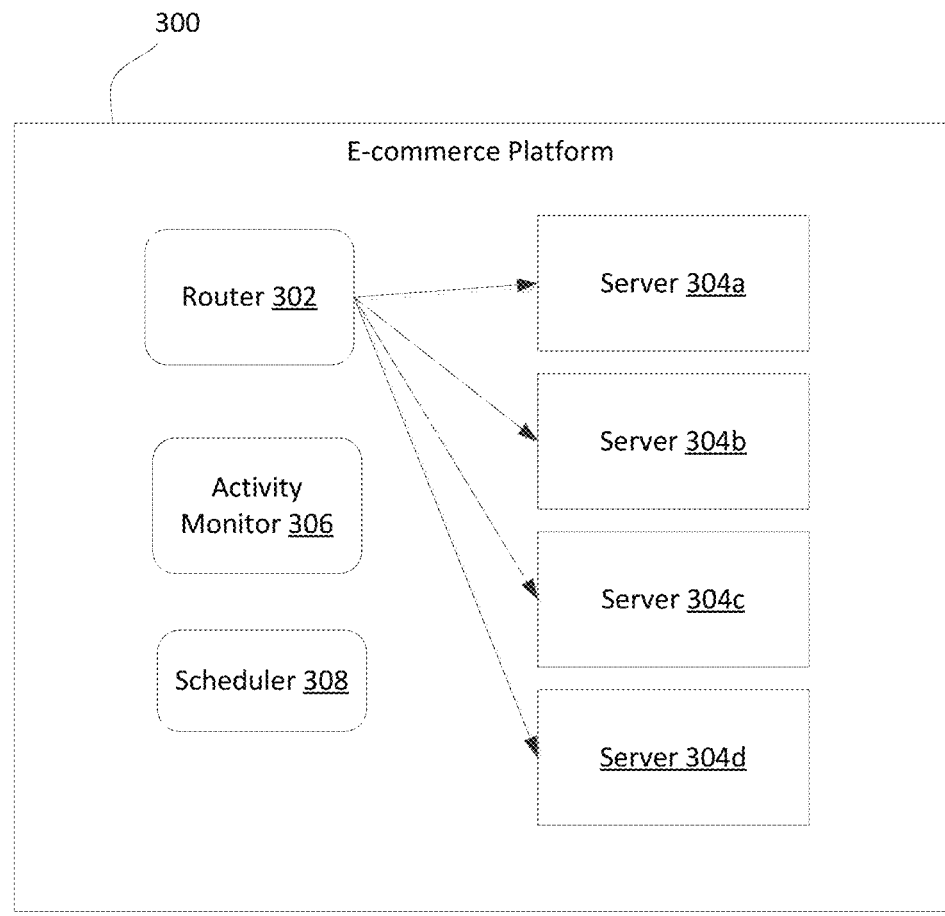
FIG. 3 is a block diagram of an e-commerce platform, according to one embodiment.

FIG. 3 illustrates an example e-commerce platform 300 in block diagram form. The e-commerce platform 300 of FIG. 3 is illustrated as distinct from the e-commerce platform 100 of FIG. 1 for ease of illustration, but these e-commerce platforms may be implemented together as a single e-commerce platform. In other words, aspects of one of the e-commerce platforms 100 and 300 may be implemented as part of the other e-commerce platform.

The e-commerce platform 300 may be implemented as a software as a service. In other words, the e-commerce platform 300 may be delivered as a service by a service provider to a service consumer, namely, a merchant. The service provider may manage or control the installation, configuration, operation and maintenance of the software that implements the e-commerce platform 300. The service provider may also manage or control resources used by the e-commerce platform 300, such as servers and data facilities, or may configure the e-commerce platform 300 to use third-party resources. The service provided by the e-commerce platform may sometimes be referred to as an online store hosting service. A merchant may obtain a license to use the store hosting capabilities of a running instance of the e-commerce platform 300. The e-commerce platform may provide merchants with facilities for creating an online store 138.

The e-commerce platform 300 includes a router 302 and a plurality of servers 304 (shown individually as 304a, 304b, 304c, 304d). The servers 304 host a plurality of online stores. More than one online store may be hosted per server. Each of the servers 304 may also include one or more components of the e-commerce platform 100 of FIG. 1 in order to host online stores. For example, each of the servers 304 may include a respective running instance of the commerce management engine 136 of FIG. 1.

The e-commerce platform 300 may further include a router 302. The router may receive, via the e-commerce platform and from a customer device, requests corresponding to an online store. The router may be configured to, upon receiving a request, identify an online store that corresponds to the request based on the request itself. For example, the router may analyze the contents of the request in order to determine a unique identifier corresponding to an online store. The request may be implemented as an HTTP request and include a destination domain name and one or more parameters. The destination domain name may uniquely identify a store. In some embodiments, the one or more parameters included in the request may also be used to uniquely identify an online store. By way of example, the request may include a name/value pair, for example, a parameter name "storeId" and a corresponding value "johnsapparel", which may be a unique store identifier. The router may map the identified store to one of the servers 304. By way of example, a lookup table may, in at least some instances, be used to map online store identifiers to server identifiers. The router may then direct the request to the identified server. In this way, the router 302 may direct requests received by the e-commerce platform 300 from customer devices to one of the servers 304.

The e-commerce platform 300 may include a customer activity monitor 306 that monitors the level of customer activity on the router 302 or the servers 304. As an example, the customer activity monitor 306 may obtain data regarding the current traffic on the router 302 and on the servers 304. The customer activity monitor 306 may be configured to provide metrics for individual online stores hosted on the servers 304. The level of customer activity may vary from one online store to another online store.

The e-commerce platform 300 may include a scheduler 308 that is configured to trigger the performance of a store-specific action at a scheduled time. The action may include the launch of an online marketing campaign, the online release of a new product, or such other action.

It will be appreciated that although the customer activity monitor 306 and scheduler 308 are illustrated as separate elements from the router 302 and the servers 304 for ease of explanation, they may be implemented as separate software applications or modules, or partially or completely together as one software application or module, or as part of a larger software application or module, within or outside the router 302 and the servers 304.

Figure 4:
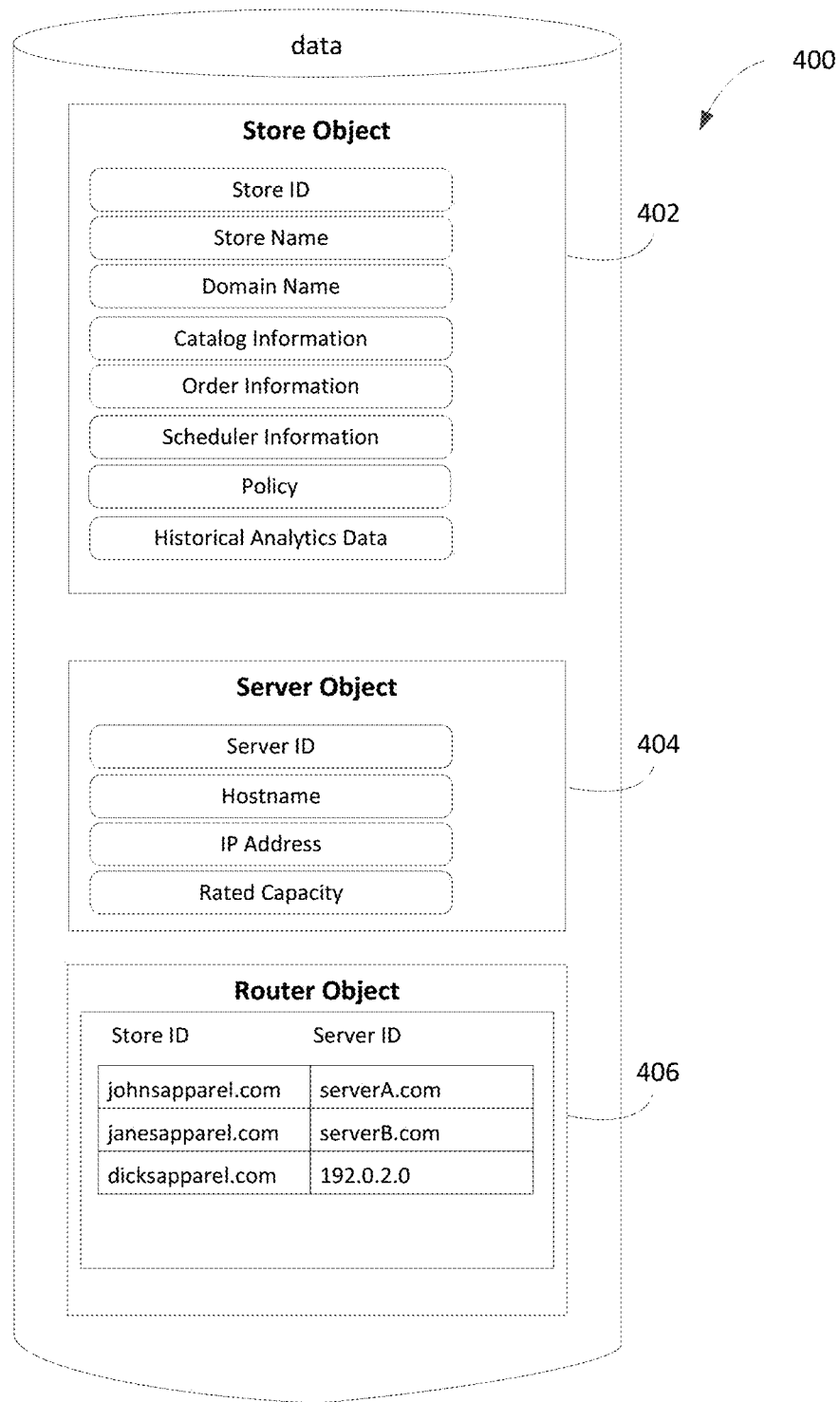
FIG. 4 shows, in block diagram form, an example data facility of an e-commerce platform, according to one embodiment.

Reference is now made to FIG. 4, which partially illustrates an example data facility 400 of an e-commerce platform in block diagram form. The data facility may be a data facility 134 of the example e-commerce platform 100 of FIG. 1 or the example e-commerce platform 300 of FIG. 3 or a data facility external to an e-commerce platform. Not all components of the data facility 400 are illustrated. The data facility 400 may include one or more data storage units. In some cases, the data storage may be in database format and may include one or more databases. The databases may be relational databases in some examples. The data facility 400 is illustrated as a single unit for ease of illustration, but may include a plurality of storage units.

The data facility 400 may contain various types of data including online store data, server data, and routing data. The online store data may include data corresponding to the online stores 138, the server data may include data corresponding to the servers 304, and the routing data may include data corresponding to the online stores 138 and servers 304.

The data facility 400 may store data regarding an online store in a store object 402. The store object 402 may be a data structure and may include details regarding an online store. Example details include a store identifier, a store name, a domain name, product catalog information, order information, scheduler information, policies and historical analytics data. The store identifier and domain name may be unique identifiers of an online store hosted on the e-commerce platform. The details may include data received by the e-commerce platform from a merchant device, such as product catalog information and may also include data generated by the system, such as a store identifier and historical analytics data.

The data facility 400 may store data regarding a server of the e-commerce platform in a server object 404. The server object 404 may be a data structure and may include details regarding a server. Example details include a server identifier, hostname, IP address, and rated capacity corresponding to the server. The server identifier, hostname and IP address may be unique identifiers of a server.

The term "rated capacity" may generally refer to a maximum load, or level of activity, a server is designed to withstand. If the load or activity on the server is greater than that for which the server was designed, the server may be referred to as being "overloaded". A server that is overloaded may experience complete failure or a degradation in performance beyond an acceptable threshold level. In other words, rated capacity may refer to the maximum level of activity a server is designed to be subjected to without complete failure of the server, failure of a component of the server, and/or degradation in the performance of the server beyond a defined threshold. The rated capacity may be expressed, for example, in the same units as one or more of the metrics monitored by the e-commerce platform. For example, the rated capacity of a server may be indicated as a maximum number of requests received per second. In some embodiments, the rated capacity may refer to a maximum recommended capacity as stated by a provider or manufacturer of the server. In some embodiments, the rated capacity is a value that is calculated by the e-commerce platform based on characteristics of the server, such as, for example, the number of processors included in the server and the speed of those processors.

The data facility 400 may further store data for routing for requests in a routing object 406. In some embodiments, the routing object may include a plurality of mapping definitions in a lookup table. A mapping definition may be defined for specifying a mapping of a parameter of a request associated with an online store to a server identifier included in the routing object. For example, a lookup table may, in at least some embodiments, be used to map a domain name of a request to a server identifier. By way of example, a lookup table may include associations such as: requests to "johnsapparel.com" are routed to "serverA.com"; requests to "janesapparel.com" are routed to "serverB.com"; requests to "dicksapparel.com" are routed to "192.0.2.0". In this example, if the store identifier is "johnsapparel.com", a router may use the lookup table to map the request to the server identified as "serverA.com". The router may use the server identifier to forward the request to the server corresponding to that server identifier.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms. An object may be illustrated as a single unit for ease of illustration, but may include a plurality of objects.

Figure 5:
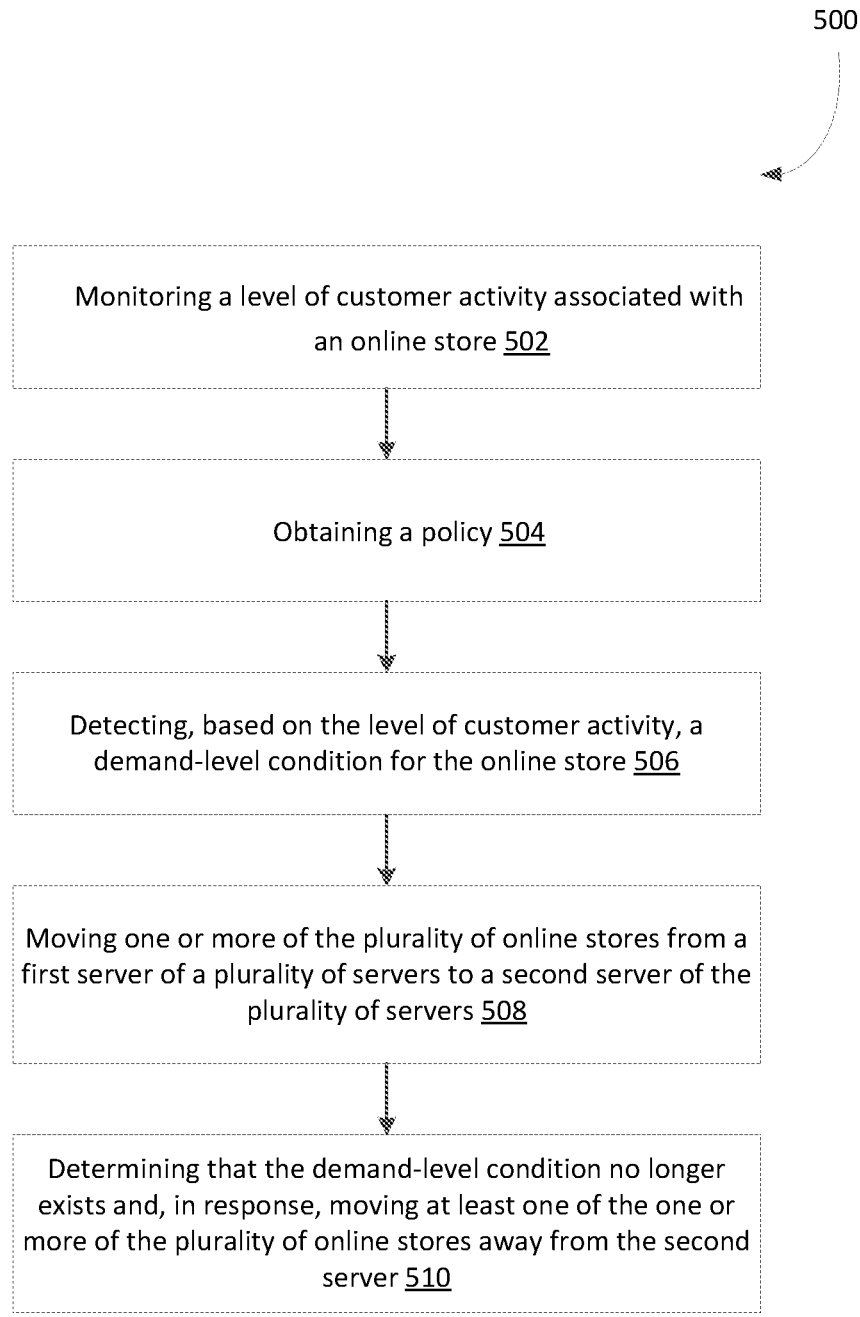
FIG. 5 shows, in flowchart form, an example method for balancing online stores across servers, according to one embodiment.
Figure 6A:
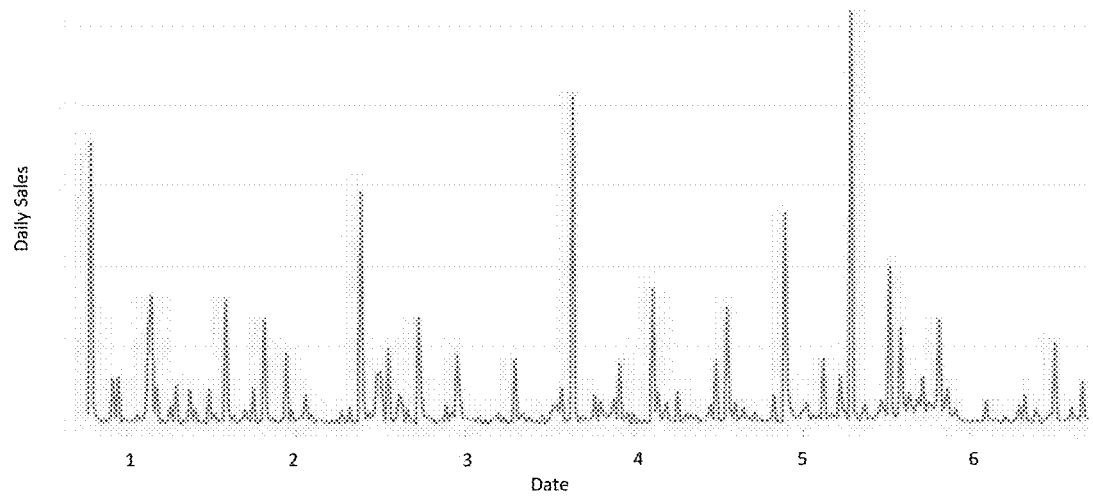
FIGS. 6A-F show, in graphic form, examples of historical levels of customer activity, according to one embodiment.
Figure 6B:
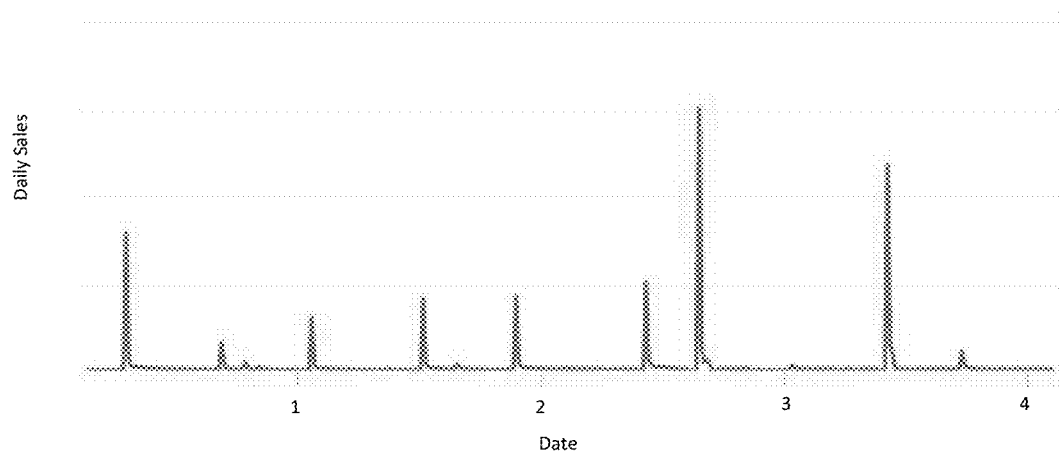
Figure 6C:
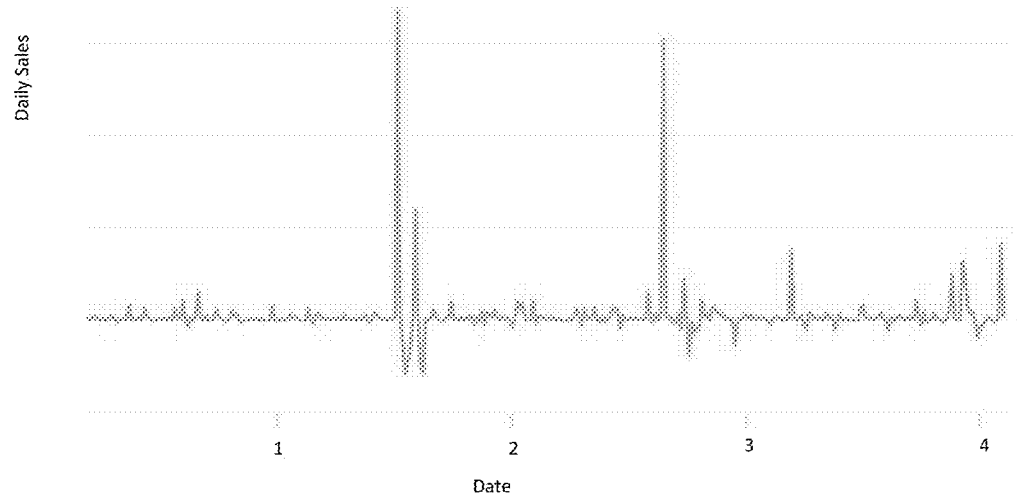
Figure 6D:
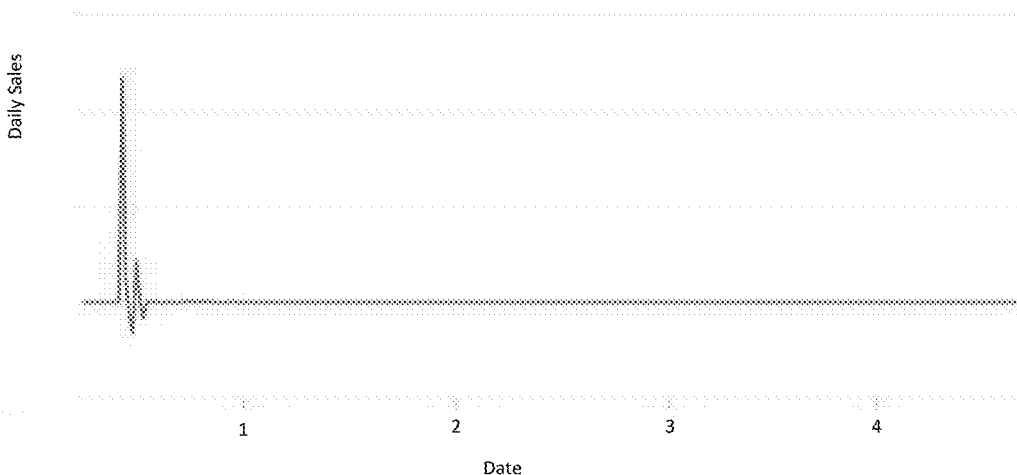
Figure 6E:
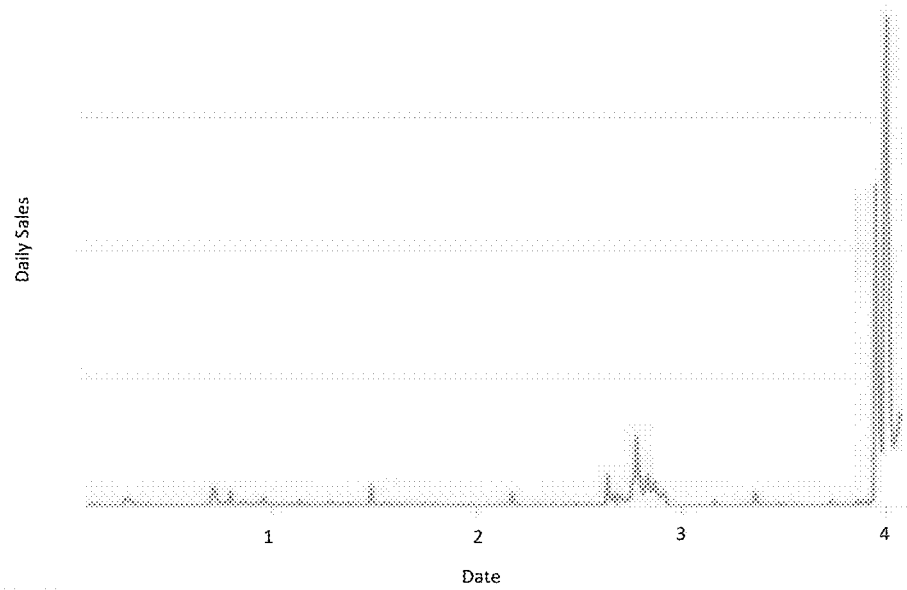
Figure 6F:
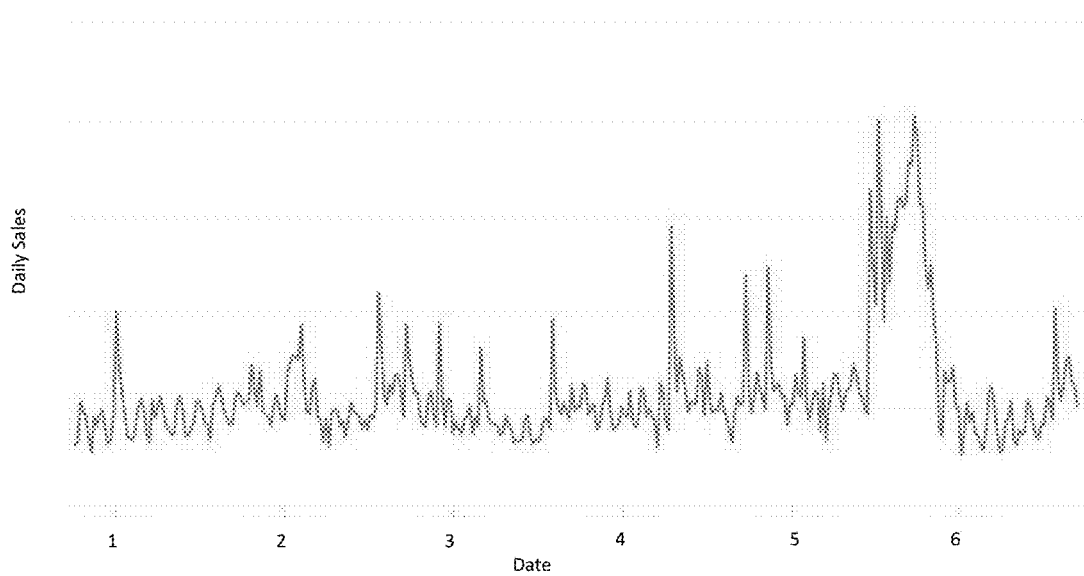
Figure 7:
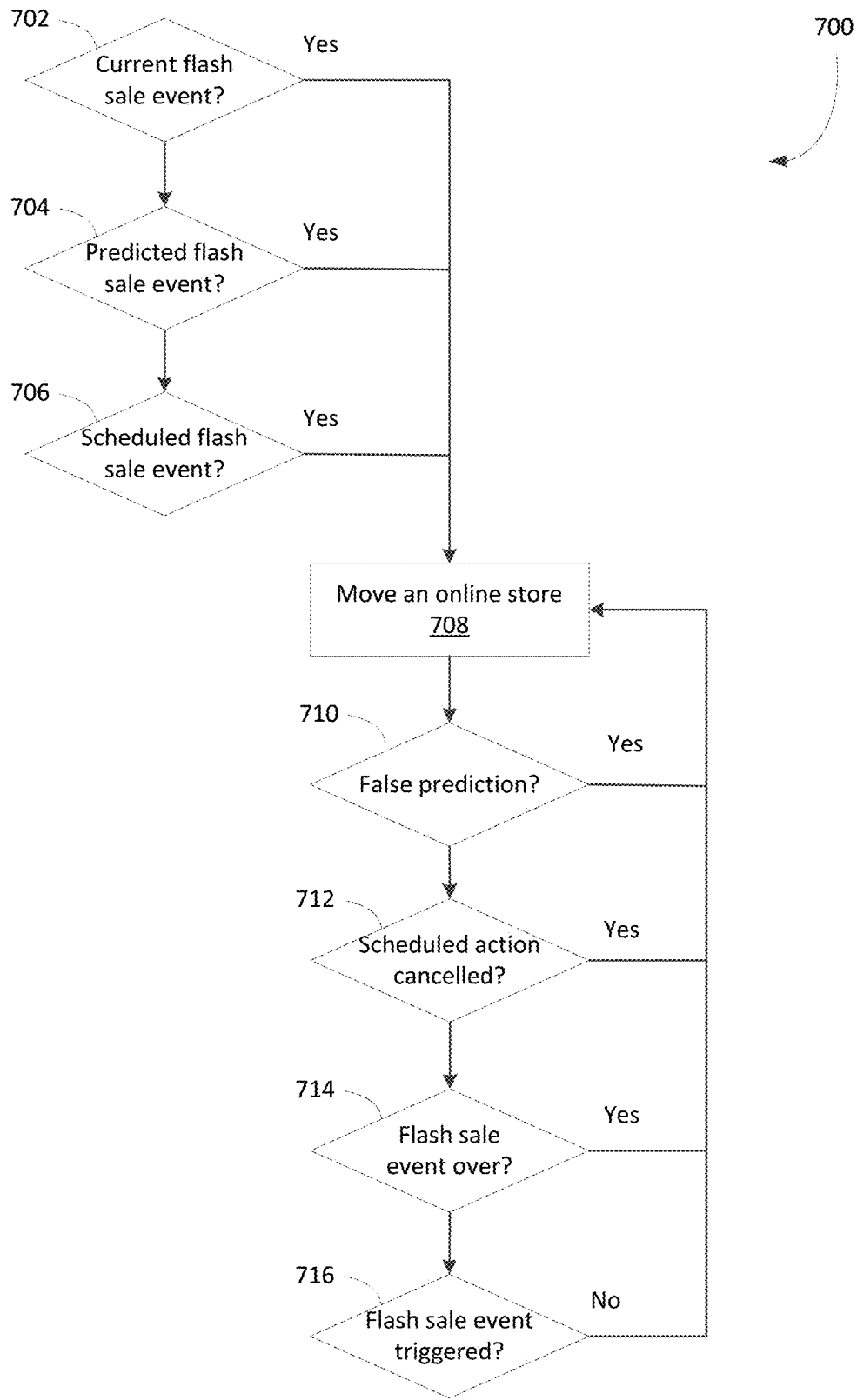
FIG. 7 shows, in flowchart form, an example method for balancing online stores across servers, according to one embodiment.

Reference is now made to FIGS. 5 and 7, which show various methods 500 and 700 related to balancing online stores across servers. These various methods may be implemented by a system suitably programmed to carry out the functions described. The system may be configured to receive or respond to communications from one or more user devices. A user device may be implemented by a customer device, such as the customer device 150 of FIG. 1. The system may include the example e-commerce platform 100 of FIG. 1 or 300 of FIG. 3; however, an implementation in an e-commerce platform is only one example. At least some of the operations may also be implemented on any device or server, as a stand-alone component or service that is external to an e-commerce platform. In some embodiments, the operations may be provided as a cloud computing service, a software as a service (SaaS), and the like. Other possibilities exist. For example, more broadly, the various operations and techniques described herein may be employed in other application domains than e-commerce. In a particular example, the subject matter of the present application could be used to balance running instances of applications or other manners of computing services such as, for example, various cloud based services.

Reference will now be made to FIG. 5, which shows, in flowchart form, a simplified example method 500 for balancing online stores across servers.

The method 500 includes, in operation 502, monitoring a level of customer activity corresponding to an online store. A level of customer activity may refer to an amount or quantity of customer activity over a defined period of time. The level of customer activity may be monitored continuously over successive windows of time. The length of each window may be, for example, a day, hour or minute. In some embodiments, the level of customer activity may be monitored over windows of time, such as, for example, short windows like 10 seconds, 30 seconds, or a minute, or, more broadly, some other temporal window.

Monitoring a level of customer activity may include monitoring usage of an online store by a customer device. Monitoring usage of an online store may include monitoring a level of interaction of a user of a customer device with a user interface corresponding to an online store. By way of example, monitoring the level of customer activity may include monitoring manual actions taken by customers. In some embodiments, a request may indicate a manual action taken by a user of a customer device. For example, the e-commerce platform may receive user input from the customer device, via an actionable user interface element, for proceeding to checkout or purchasing a particular product immediately. For example, the request may indicate a user selection of a "Proceed to Checkout" button or a "Buy Now" button on a webpage of an online store hosted on the e-commerce platform. By way of another example, the e-commerce platform may receive user input via an actionable user interface element provided as a link. The link may be in the form of an image that is selectable or clickable by a user. The image may be an advertisement or promotion of a product. The request may indicate the selection of the image by the user. The e-commerce platform may count the number of requests received that indicate the selection of a particular user interface element. The rate at which the requests are received may generally be referred to as a "click rate" for that user interface element.

Monitoring a level of customer activity may include monitoring a level of usage of a resource by an online store. For example, the router or server may receive, from a customer device, a request corresponding to an online store. The request may be associated with or indicate an action to be taken by the server. The action may include or involve accessing a resource. The e-commerce platform may monitor the number of times that a particular resource is accessed in response to receiving, from customer devices, requests corresponding to the online store. The number of times a particular resource is accessed in response to individual requests may vary from one request to another. Examples of resources that may be associated with the request include a checkout function, order function, payment function, shipping rate function, tax rate function, credit card validation function, address validation function, postal or zip code validation function, order form validation function, order tracking function, order return function, currency conversion function, new customer registration function, and a chat function connecting a user of the user device with a customer service representative of an online store.

Monitoring a level of customer activity may include monitoring a level of browsing activity. Monitoring a level of browsing activity may include monitoring a traffic load. The traffic load for a particular online store may include a count of total requests, being received by the router or servers, corresponding to an online store, a particular page of an store (e.g. a product page or product category page), or a subset of pages of an online store. The traffic load may also include a count of total page views corresponding to a graphical user interface of the online store.

The level of browsing activity may also include a count of unique visitors to the online store. The number of unique visitors may be determined by counting the number of uniquely identified clients that are generating requests or page views within a defined time period. A uniquely identified client may be an instance of a browser client or a client device. A client may be identified using a unique identifier stored in a browser cookie and/or the IP address of the client device.

The level of browsing activity may also include a count of currently active browsing sessions. A browsing session may refer to a series of requests received from a particular client. A browsing session may end or "time out" when the server receives no further requests from the particular client for a defined time period.

More granular levels of browsing activity may be monitored. For example, a level of browsing activity may include a level of referral, shopping cart, checkout, order and payment activity. Monitoring each of these levels of activity may include monitoring a corresponding traffic load.

By way of example, monitoring a level of referral activity may include monitoring the number of requests received from a particular referral source. The particular referral source may be identified using referrer information included in the request. The referrer information may be in the form of a web address of a previous webpage from which a link to a currently requested webpage was followed. For example, the referrer may be a web address of a webpage, such as a social media or webmail webpage, that provides a click-through link to the requested webpage.

By way of another example, monitoring a level of shopping cart activity may include monitoring the number of requests to add a particular product to an online shopping cart.

By way of another example, monitoring a level of checkout activity may include monitoring the number of requests received in association with a checkout function of an online store.

By way of another example, monitoring a level of order activity may include monitoring a traffic load or a sales metric. The traffic load may include the number of requests received corresponding to orders. The sales metric may include the total value of products ordered.

By way of another example, monitoring a level of payment activity may also include monitoring a traffic load or a sales metric. The traffic load may include a count of requests received corresponding to order payments. The sales metric may include the total value of payments made.

The system may store the monitored level of customer activity as historical analytics data in the store object 402 of FIG. 4.

Reference will now be made to FIGS. 6A-F, which show historical analytics data in graphic form. More particularly, the graphs show example results of monitoring the level of customer activity for example online stores. Each graph shows a sales metric, namely daily sales, for a respective example online store over a period of time.

Referring again to FIG. 5, in operation 504, the system may obtain a policy. The policy may be stored in memory that is accessible by the system. In some embodiments, the policy may be retrieved from the data facility 134. The policy may specify, for example, a threshold level of customer activity. The threshold may be a minimum threshold or a maximum threshold.

In operation 506, the system detects, based on the level of customer activity, a demand-level condition for the particular online store. The determination may be based on the observed level of customer activity and may involve a comparison with the threshold specified by the policy. For example, the observed level of customer activity may be compared with a threshold rate specified in the policy. If the comparison indicates that the observed level of customer activity is above a first threshold value, then a high demand-level condition may be detected. If the observed level of customer activity is below a second threshold value, then a low demand-level condition may be detected. The first and second thresholds may be the same value or the first threshold value may be higher than the second threshold value.

In operation 508, the system moves one or more of the plurality of online stores from a first server of a plurality of servers to a second server of the plurality of servers. The move may be responsive to the detecting of the demand-level condition for the particular online store.

The first and second servers may have the same rated capacity or may have different capacity ratings. A rated capacity of the first server may be less than or greater than a rated capacity of the second server. In other words, the first server may include increased or decreased computing resources than the second server. Computing resources may include, for example, a quantity or speed of processors or memory. Put another way, the first server may be configured for servicing a predetermined load higher than a predetermined load of the second server, or vice versa.

In response to detecting the demand-level condition, the system may either move the particular online store from the first server to the second server without moving other online stores or may move one or more online stores without moving the particular online store. In other words, the online stores that are moved may include only the particular online store or may not include the particular online store.

If a high demand-level condition is detected, the move may be performed in a manner that increases the resources available to the particular online store. For example, if the particular online store is hosted on the first server along with other online stores, one or more of the other online stores may be moved to a second server in order to increase the unused capacity of the first server.

In some embodiments, if a high demand-level condition is detected, the determination of whether to move the particular store may be based on the current unused capacity of the first and second servers and the current capacity used by the particular online store. The system may determine the current unused capacity of the first and second servers and the current capacity used by the particular online store. If the particular online store is hosted on the first server, and if the current unused capacity of the first server plus the current capacity used by the particular online store first is less than current unused capacity of the second server, then the system may move the particular online store to the second server. In this way, the server resources and unused capacity available to the particular online store may be increased.

If a low demand-level condition is detected, the move may be performed in a manner that decreases the resources available to the particular online store. For example, if the particular online store is hosted on the second server, one or more of the online stores may be moved from the first server to a second server in order to decrease the unused capacity of the second server.

In some embodiments, if a low demand-level condition is detected, the determination of whether to move the particular store may, additionally or alternatively, be based on the current unused capacity of the first and second servers and the current capacity used by the particular online store. The system may determine the current unused capacity of the first and second servers and the current capacity used by the particular online store. For example, if the particular online store is hosted on the first server and the current unused capacity of the second server is greater than the current capacity used by the particular online store, and if the current unused capacity of the first server less the current capacity used by the particular online store first is greater than current unused capacity of the second server, then the system may move the particular online store to the second server. In this way, the server resources and unused capacity available to the particular online store may be decreased.

Moving an online store from a first server to a second server may refer generally to moving the servicing of requests from the first server to the second server. In other words, it may refer to modifying the system to use the second server to service customer requests corresponding to the online store instead of the first server. The first server ceases to service requests associated with the online store and the second server commences servicing requests associated with the online store.

The system may configure a router to cease directing requests corresponding to the online store to the first server and queue any new requests until the second server is ready to begin servicing requests associated with the online store. The first server may finish servicing any requests that it has already received in association with the online store and provide responses to customer devices. The second server may be configured to service requests corresponding to the online store. This operation may depend on how the online store is deployed.

In some embodiments, the online store is a store hosted on an e-commerce platform that is provided as SaaS. In other words, the online store may be deployed to a running instance of an e-commerce software application that provides online store hosting as a service. Moving the online store may include transferring assets (e.g. configuration files, database shards, database records, image files) associated with the online store either from the first server and/or a different server and configuring an e-commerce software application hosted on the second server with those assets in order to serve the online store from the second server. In some embodiments, an asset may include the store object 402 of FIG. 4 or a portion thereof.

In some embodiments, not all assets corresponding to an online store are stored on the first or second servers or accessible by these servers. For example, static store assets such as image files may be served from a separate file server. Moving an online store from a first server to a second server may include copying only assets that are stored on the first server to the second server. Similarly, not all requests corresponding to an online store that are received by the system may be serviced by the first or second servers. Other requests, such as order requests or payment requests, may be serviced by the first or second servers. Moving an online store from a first server to a second server may include directing to the second server and servicing by the second server any requests associated with the online store that would otherwise have been directed to and serviced by the first server.

In some embodiments, the online store may be a web application that is deployed to a first installation instance of a web server application hosted on the first server. Moving such an online store may include deploying the web application to a second installation instance of the web server application hosted on the second server.

In some embodiments, the online store may be hosted on a virtual server that is distinct and separate from virtual servers hosting other online stores. Moving such an online store may involve stopping a virtual server that hosts the online store on a first physical server, copying a virtual server file corresponding to the virtual server from the first physical server to a second physical server, and restarting the virtual server on the second physical server.

Once the second server has been configured to service requests corresponding to the online store, the router may be configured to direct requests corresponding to the online store to the second server instead of the first server by updating routing data. The second server may then receive and service requests associated with the online store.

In operation 510, the server determines, based on a second level of customer activity associated with the online store, the demand-level condition for the online store no longer exists and, in response, moves at least one of the one or more of the plurality of online stores away from the second server. The move may be to the first server or to a third server. The online stores that are moved may or may not include the online stores that were moved in operation 508 and may or may not include the online store associated with the second level of customer activity. The demand-level condition may no longer exist if, for example, there is a transition from a high demand-level condition to a low-level condition, or vice versa.

Reference will now be made to FIG. 7, which shows, in flowchart form, a simplified example method 700 for balancing online stores across servers. In some embodiments, the operations 702, 704, 706, 710, 712 or 714 may correspond to the operation 506 of FIG. 5 and the operation 708 of FIG. 7 may correspond to the operation 508 of FIG. 5. Operations 702, 704 and 706 may also correspond to detecting a high demand-level condition and, more particularly, to detecting a predicted, current and scheduled high demand-level condition, respectively. Operations 710, 712 and 714 may also correspond to detecting a low demand-level condition and/or to detecting the end of a high demand-level condition.

In operation 702, the system may detect that the level of customer activity is suggestive of a current flash sale event. The term "flash sale event" may refer generally to a spike in order requests received by an online store. The event may occur for a short period of time that may last a few seconds, minutes or hours.

A level of customer activity may be a current, recent, or historical level of customer activity. A current level of customer activity may include the level of customer activity corresponding to a window of time that includes the current time. A recent level of customer activity may include the level of customer activity corresponding to one or more windows of time immediately preceding a current window of time. The historical level of customer activity for an online store may include levels of customer activity corresponding to historical windows of time, which may include windows of time prior to the current window of time.

An online store may have a "normal" level of customer activity. The normal level of customer activity may be determined based on historical levels of customer activity. In some cases, an average or median historical level of customer activity may be referred to as a normal level of customer activity.

In order to detect that the monitored level of customer activity is suggestive of a current flash sale event, the system may compare a current level of customer activity of the online store to a normal level of customer activity. If the ratio of the current level of customer activity to the normal level of customer activity exceeds a threshold ratio, then the current or recent level of customer activity may be suggestive of a current flash sale event.

The threshold ratio may be obtained from a policy and may be specific to an online store or the system. For example, the threshold ratio for an e-commerce platform or an online store may be 10:1. If the system determines that the current rate of order requests is at least ten times greater than a normal rate of order requests, then the current level of customer activity is suggestive of a current flash sale event.

The system may additional or alternatively compare a recent level of customer activity of the online store to a normal level of customer activity. However, in this case, the accuracy of the detection may depend on the length of the windows of time in which the level of customer activity is monitored. If the windows of time are short, for example, one or five seconds in length, then the recent level of customer activity may be a close approximation of the current level of customer activity.

In order to detect that the monitored level of customer activity is suggestive of a current flash sale event, the system may also determine whether the change in the level of customer activity, from a normal level of customer activity to the current or recent level of customer activity, is sudden. In other words, the detection may be based on determining that the rate of change in the level of customer activity exceeds a threshold rate of change. For example, the system may measure the time that has elapsed from when the normal level of customer activity was last observed to the current time. The elapsed time may be compared with a threshold time. If the elapsed time is less than the threshold time, then the monitored level of customer activity may be suggestive of a current flash sale event.

Reference is now made to FIGS. 6A-F, which show historical levels of customer activity for example online stores. In these examples, the daily sales for example online stores are shown over a period of time. In these examples, if a threshold ratio of 10:1 is used, various spikes in sales as shown in the graphs of FIGS. 6A-E may be detected as being suggestive of a current flash sale event, whereas the sale metric shown in the graph of FIG. 6F has a current to normal ratio that peaks at about 4:1, which would not be considered sufficient to be suggestive of a current flash sale event.

Referring again to FIG. 7, in operation 704, the system may detect a predicted flash sale event. A flash sale event for an online store may be predicted based on a current level of customer activity. As an example, a flash sale event may be predicted based on detecting a current spike in traffic. More particularly, detecting a predicted flash sale event may include determining that the rate of change in the level of customer activity exceeds a threshold rate of change. For example, a predicted flash sale event may be detected by determining that an acceleration (i.e. positive rate of change) in sales exceeds a threshold rate of change in sales.

In operation 706, the system may detect a scheduled flash sale event. Detecting a scheduled flash sale event may include determining that the system is scheduled to automatically perform a store-specific action at a scheduled future time.

In operation 708, in response to detecting that the level of customer activity is suggestive of a current flash sale event, or detecting the predicted flash sale event, or detecting the scheduled flash sale event, the system may move one or more of the plurality of online stores from a first server of a plurality of servers to a second server of the plurality of servers.

In operation 710, subsequent to detecting a predicted flash sale event in operation 704, the system may determine that the prediction is false. A false prediction may be detected if the system fails to detect, within a threshold period of time after detecting the predicted flash sale event, that a level of customer activity is suggestive of a current flash sale event as in operation 702.

In operation 712, subsequent to detecting the scheduled flash sale event in operation 706, the system may detect that the scheduled action has been cancelled.

In operation 714, subsequent to detecting that the level of customer activity is suggestive of a current flash sale event in operation 702, or detecting a predicted flash sale event in operation 704, or subsequent to detecting that the scheduled flash sale event in operation 706, the system may detect that a level of customer activity is not suggestive of a flash sale event. In other words, the system may detect that a flash sale has ended. In some embodiments, that system may detect that the level of customer activity has returned to a normal level of customer activity or within a threshold amount of a normal level of customer activity.

For example, subsequent to detecting that the level of customer activity is suggestive of a current flash sale event in operation 702, the system may determine that the level of customer activity is no longer suggestive of a current flash sale event.

As another example, subsequent to detecting that the predicted flash sale event in operation 702, the system may determine that the level of customer activity is suggestive of a current flash sale event and, subsequent to that operation, the system may determine that the level of customer activity is no longer suggestive of a current flash sale event. In other words, the system may determine that the prediction was correct and that the flash sale has ended.

As another example, subsequent to detecting the scheduled flash sale event in operation 706, the system may perform the scheduled action and then determine that the level of customer activity is suggestive of a current flash sale event and, subsequent to that operation, the system may determine that the level of customer activity is no longer suggestive of a current flash sale event. In other words, the system may determine that performing the scheduled action resulted in a flash sale event and that the flash sale has ended.

In operation 716, subsequent to detecting the scheduled flash sale event in operation 706, the system may perform the scheduled action. If the system then fails to detect, within a threshold period of time after detecting the predicted flash sale event, that a level of customer activity is suggestive of a current flash sale event as in operation 702, the system may determine that performing the scheduled action did not trigger a flash sale event.

In operation 710, in response to detecting that the prediction is false, or determining that the current or scheduled flash sale events has ended, or determining that a flash sale event was not triggered by performing the scheduled action, the system may move one or more of the plurality of online stores from the second server of a plurality of servers to the first server or to a third server (that is not the first server) of the plurality of servers. In some embodiments, the move may be responsive to the system operating, for a threshold period of time, without detecting a level of customer activity that is suggestive of a current flash sale event, without detecting a predicted flash sale event, and/or without detecting a scheduled flash sale event. In some embodiments, the move may include reversing the move that had been made previously in response to operations 702, 704 or 706 of FIG. 7.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
 monitoring third-party access corresponding to a particular online store;
 detecting, based on the monitored third-party access, a demand-level condition for the particular online store; and
 responsive to the detecting of the demand-level condition for the particular online store:
  ceasing to service, by a first server, requests associated with the particular online store; and
  configuring a second server to service requests associated with the particular online store and commencing to service, by the second server, requests associated with the particular online store.

2. The method of claim 1, wherein detecting the demand-level condition includes detecting that the monitored third-party access is suggestive of a current flash sale event.

3. The method of claim 1, wherein detecting the demand-level condition includes detecting a projected flash sale event.

4. The method of claim 1, wherein detecting the demand-level condition includes detecting a scheduled flash sale event.

5. The method of claim 1, wherein the demand-level condition includes a high demand-level condition.

6. The method of claim 1, wherein the demand-level condition includes a low demand-level condition.

7. The method of claim 1, further comprising determining, based on a level of customer activity, the demand-level condition no longer exists and, in response, moving at least one of one or more of a plurality of online stores away from the second server, wherein the plurality of online stores includes the particular online store.

8. The method of claim 1, wherein the second server has increased computing resources in comparison to the first server.

9. The method of claim 1, wherein configuring the second server includes transferring an asset to the second server.

10. The method of claim 1, further comprising, responsive to the detecting of the demand-level condition for the particular online store, updating routing data to direct requests associated with the particular online store to the second server.

11. The method of claim 1, further including mapping requests associated with the particular online store to a single server in a plurality of servers, including the first and second server and, responsive to the detecting of the demand-level condition for the particular online store, mapping requests associated with the particular online store to the second server instead of the first server.

12. A system, the system comprising:
a processor; and
a memory storing computer-executable instructions that, when executed by the processor, cause the processor to:
monitor third-party access corresponding to a particular online store;
detect, based on the monitored third-party access, a demand-level condition for the particular online store; and
responsive to the detecting of the demand-level condition for the particular online store:
cease servicing, by a first server, requests associated with the particular online store; and
configure a second server to service requests associated with the particular online store and commence servicing, by the second server, requests associated with the particular online store.

13. The system of claim 12, wherein detecting the demand-level condition includes detecting that the monitored third-party access is suggestive of a current flash sale event.

14. The system of claim 12, wherein detecting the demand-level condition includes detecting a projected flash sale event.

15. The system of claim 12, wherein detecting the demand-level condition includes detecting a scheduled flash sale event.

16. The system of claim 12, wherein the demand-level condition includes a high demand-level condition.

17. The system of claim 12, wherein the demand-level condition includes a low demand-level condition.

18. The system of claim 12, wherein the instructions, when executed by the processor, are to cause the processor to determine, based on a level of customer activity, the demand-level condition no longer exists and, in response, move at least one of one or more of a plurality of online stores away from the second server.

19. The system of claim 12, wherein the second server has increased computing resources in comparison to the first server.

20. A non-transitory computer-readable medium storing processor-executable instructions that, when executed by one or more processors, are to cause the one or more processors to:
monitor third-party access corresponding to a particular online store;
detect, based on the monitored third-party access, a demand-level condition for the particular online store; and
responsive to the detecting of the demand-level condition for the particular online store:
cease servicing, by a first server, requests associated with the particular online store; and
configure a second server to service requests associated with the particular online store and commence servicing, by the second server, requests associated with the particular online store.

* * * * *